(No Model.) 3 Sheets—Sheet 1.
F. W. WIESEBROCK.
PROCESS OF MANUFACTURING MALT.
No. 456,872. Patented July 28, 1891.
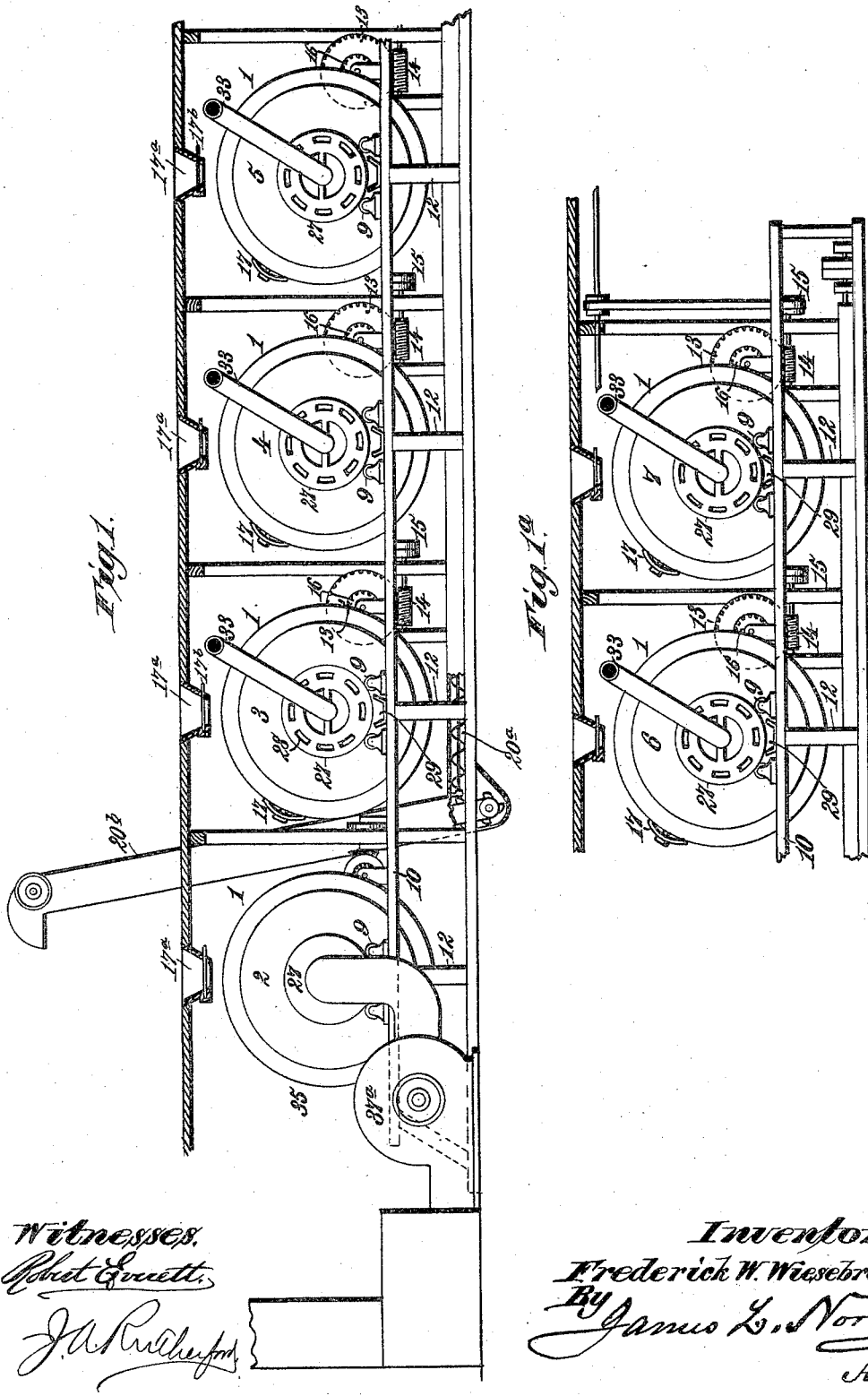
Witnesses,
Robert Emmett,
J. A. Rutherford.
Inventor
Frederick W. Wiesebrock.
By James L. Norris.
Atty.

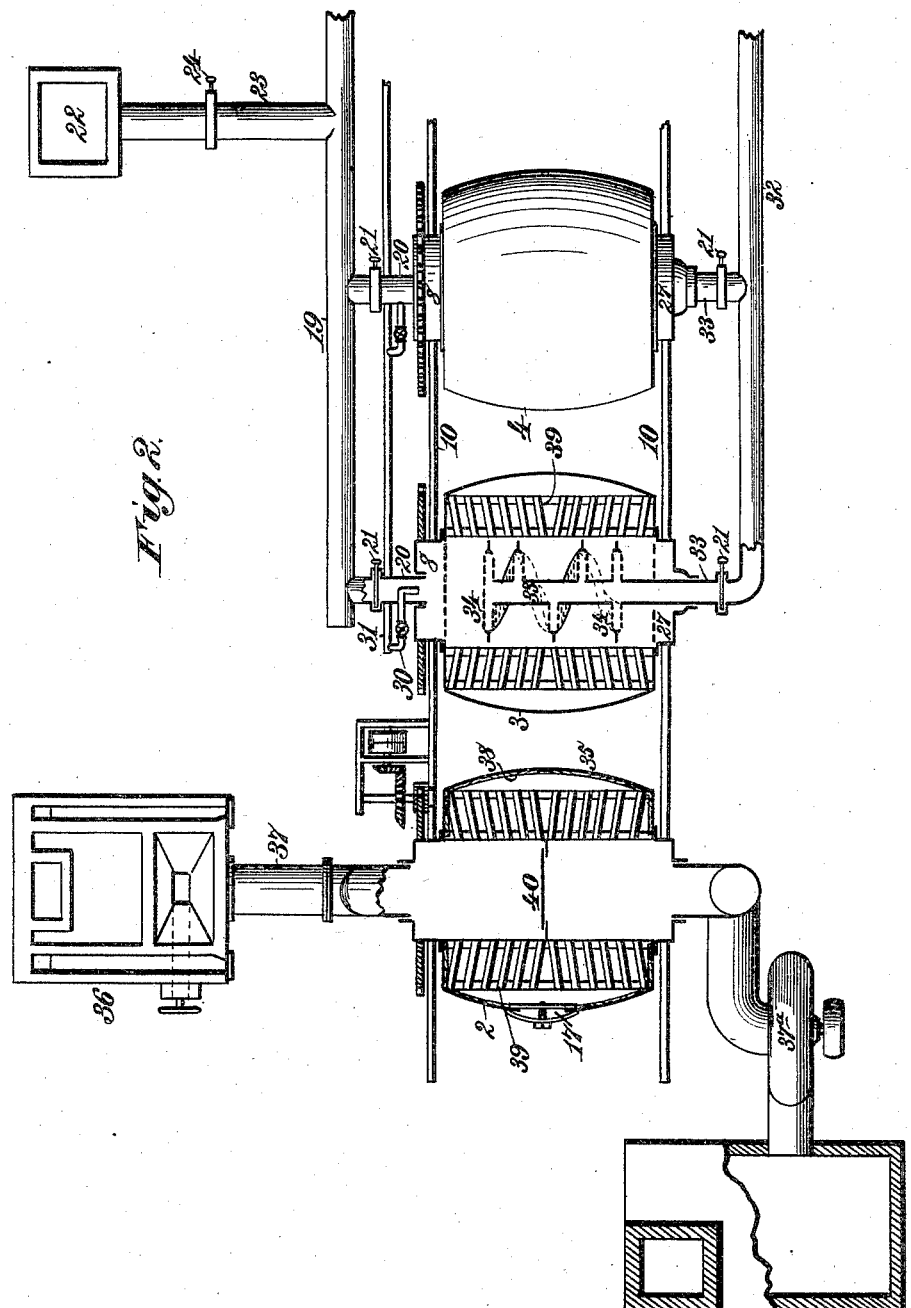

(No Model.) 3 Sheets—Sheet 3.
F. W. WIESEBROCK.
PROCESS OF MANUFACTURING MALT.
No. 456,872. Patented July 28, 1891.
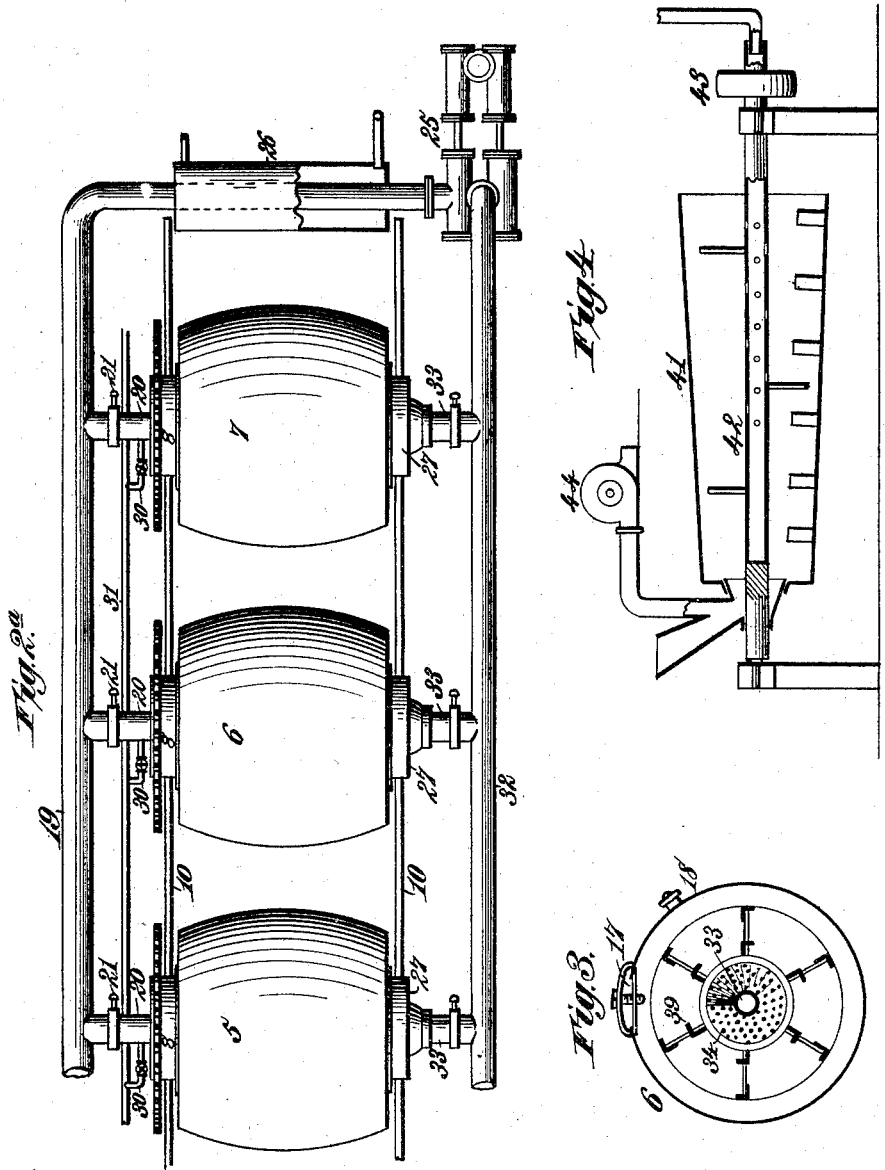
Witnesses:
Robt Everett
J. A. Rutherford
Inventor:
Frederick W. Wiesebrock,
By James L. Norris.
Atty.

UNITED STATES PATENT OFFICE.

FREDERICK W. WIESEBROCK, OF NEW YORK, N. Y.

PROCESS OF MANUFACTURING MALT.

SPECIFICATION forming part of Letters Patent No. 456,872, dated July 28, 1891.

Application filed October 21, 1890. Serial No. 368,852. (No specimens.)

*To all whom it may concern:*

Be it known that I, FREDERICK W. WIESEBROCK, a citizen of the United States, residing at New York, in the county of New York and State of New York, have invented new and useful Improvements in the Manufacture of Malt, of which the following is a specification.

It is the purpose of my invention to provide a novel process for the manufacture of malt to be used in the production of fermented liquors, said process being of such a character that it may be practiced at all seasons of the year. It is my purpose, also, to materially cheapen the production of malt, to render the same independent of skilled labor, and to produce more uniform and better results than have been attainable heretofore.

The invention consists in a novel process or method of procedure and in the mechanism for practicing such process, hereinafter fully set forth, and then pointed out definitely in the claims which follow this specification.

To enable others skilled in the art to make and use my said invention, I will proceed to describe the same in detail, reference being had to the accompanying drawings, which show one form of apparatus for the practice of my newly-discovered process, and in which—

Figures 1 and 1ª, taken together, constitute a front elevation of a malting apparatus embodying my invention. Figs. 2 and 2ª, taken together, constitute a plan view, partly in section, of the parts shown in Figs. 1 and 1ª. Fig. 3 is a cross-section through the center of the steeper and germinator. Fig. 4 is a sectional view of a drier in which atmospheric air of normal temperature is used to effect a partial drying of the green malt.

Heretofore and prior to my invention the grain—such as barley, oats, &c.—has been placed in a vessel which was stationary and covered with water for the purpose of steeping. After the grain had been submerged for eight or ten hours the water would be renewed and the process continued for forty to sixty hours, which was the time ordinarily required. In this process no means were employed for cleansing the grain of its adhering impurities, and it was not unusual to find that fungoid growths were formed thereon during the process of germination, which interfered very seriously and injuriously with the manufacture of the liquor, and frequently ruined the same.

In my process of steeping the grain for the production of good malt I place it in a rotating vessel, which I term the "steeping and germinating chamber," and fill the latter partly full of water having a temperature of about 50° to 60° Fahrenheit. This vessel is then rotated slowly, and at the same time a slow current of water is caused to flow therethrough, whereby the grain is not only cleansed of its adherent impurities or microorganic growths, but it is by the rotary movement of the vessel alternately immersed in the water in the lower half of said vessel and then raised out of the water and exposed to atmospheric air, thereby producing a better quality of malt than has been heretofore manufactured under the process referred to, in which it is subjected to a continuous immersion. The rubbing of the grains one against the other caused by the slow rotation of the vessel in which they are contained causes a constant attrition, which thoroughly cleanses the grain, removes the adhering impurities, and frees it from the organic matter which may have been brought in from the fields, and from which fungoid growths may result, as already pointed out, which may prevent a perfect germination and which invariably proves injurious to the yeast-germ. The impurities thus removed float upon the surface of the water and are carried off by the constant current circulating through the steeping-vessel.

To make my invention clearly understood I will proceed to describe the same with reference to the drawings, in which—

The reference-numeral 1 designates a series of cylindrical vessels, arranged in line and numbered consecutively from 2 to 7, inclusive. These vessels are each provided with concentric heads 8, which rest upon anti-friction rolls 9, journaled upon a rail 10, supported in front and rear of each vessel by standards 12. Upon said rail are also mounted worm-gears 13, having mesh with worms 14, driven by pulleys 15, the shaft of the worm-gears having pinions 16, which drive the cylindrical vessels, the worms being actuated from any suitable source of power. Each vessel is provided with a man-hole 17, and also with a hand-hole 18, to enable the operator to sample the grain during the process of steeping and germination. At the rearward ends of said vessels extends an air-suction pipe 19, having connection with each by a branch 20, which is provided with a valve or cut-off 21, and this pipe has communication with a natural draft 22, connected with the pipe 19 by a branch 23, which may be closed by a cut-off 24. Said pipe also communicates with an air-engine 25, by which atmospheric air may be drawn through any one or all of said vessels. In order to regulate the temperature of the air a section of the pipe supplying the same may be passed through a vessel 26, in which a cooling or heating medium may be placed, according to the season of the year. Each vessel or cylinder is supplied with a head-plate 27, having perforations 28, and beneath the series of these head-plates a trough 29 is placed to receive the water escaping from each cylinder or drum. Water is admitted to each drum in the series through pipes 30, which have communication with a continuous pipe 31, deriving its supply from any given source.

Communicating with the air-forcing engine 25 is an air-pipe 32, having connection by means of lateral branches 33 with each drum. These branches pass through the perforated head-plates and connect with interior pipes 33, having perforated helices 34, by which the air is equally distributed and brought into contact with all the grain as it constantly is shifted about by the stirrers 39.

The drum 2 in the drawings denotes the drier, which consists of a cylindrical centrally-enlarged shell 35, similar in form to the steepers and germinators. It is connected at one end with an air-heating furnace 36 by means of a pipe or flue 37, at the other end with an exhaust 37$^a$, discharging into an enlarged portion of the chimney. To prevent radiation of heat from the drier, it is provided with a wood lining 38, or, if preferred, it may be made entirely of wood. The drum is rotated by worm-gearing or other suitable mechanism, and is supported upon anti-friction rollers, like the steepers and germinators. Within its interior it is supplied with a series of stirrers or agitators 39, so arranged that they not only elevate the grain from the lower portion of the drier to its upper part, but also tend to draw the grain from the ends toward the center of the drum by the concentric arrangement of the stirrer-blades, thus insuring a constantly-changing exposure of the different portions of the grain to the action of the passing currents of heated air.

In order to eliminate a portion of the moisture from the green malt by means of air of ordinary temperature, I may expose said malt in a specially-constructed drum to rapid currents of ordinary air, the grain entering said drum being taken up by the stirrers of the same and carried gradually to the other or exit end of said drum. During its transit it is exposed to currents of air created by an exhaust, and is thereby partially dried, sufficiently so to lie without injury for a short time should the charge in the drier not be ready for removal. If the drier 2 is ready, however, to receive the green malt, then this process may be performed in the drier itself.

In order to prevent the air entering the drier from traversing the same too rapidly and escaping before it has become fully charged with moisture, one or more shields 40 may be inserted therein transversely to the longitudinal axis of the drum.

Heretofore germination has been carried on by flooring the moist grain in more or less thick layers and exposing it to a given temperature for a certain period. This process required for its successful practice the employment of skilled labor to maintain the necessary temperature and moisture. Attempts have been made, also, to germinate grain in rotating vessels through which currents of air are process, and I do not broadly claim such process as my invention. My invention differs therefrom as follows:

The numerals 3, 4, 5, 6, and 7 denote the steeping and germinating vessels, each already described.

In order to carry on the process without loss of time, I begin by partially filling one of the said steeping and germinating vessels, which is accomplished by removing the cover or cap of the man-hole 17 and then rotating the vessel until the man-hole therein lies directly beneath a hopper 17$^a$, depending from the floor of a bin or other grain-repository, the lower end of the hopper being provided with a valve or gate 17$^b$. A similar hopper is arranged over each one of the vessels in the series. Water is then supplied to said vessel until the water-level rises to the lower portion of the central perforated plate in the head of the vessel, the water thereby partially covering the grain. The water-supply, which is maintained at a proper temperature, is now reduced to a small stream, in order that a constant circulation may be maintained, flowing through the vessel from the point of its inlet to the perforated plate in the other end, through which it escapes. During this operation the cylinder is gently rotated, and at the same time air is drawn through the same and brought into contact with the grain in the manner already described. The steeping is complete when the grain will produce a white or floury mark upon a board if rubbed across one of the man-hole covers. When this point in the process is reached, the water is removed from the grain by first attaching a strainer to the man-hole, whereupon the vessel is rotated to bring this strainer underneath and allow the water to drain off. Then the vessel is turned until the man-hole is at the upward or higher part of the vessel, and the strainer is then removed and the man-hole closed with the cover. The vessel is then set in slow rotation, and now germination commences. Germination creates heat, and the heated grain readily absorbs moisture. Therefore the air apparatus is set in motion and air is drawn by said apparatus through the body of grain in process of steeping in one or more of the other vessels. This air becomes loaded with moisture and cooled, thereby airing the steeping grain, and then, passing through the air forcing and cooling apparatus, it is forced by way of the hollow helices into the body of grain in process of germination, thus supplying this grain with the necessary moisture and carrying away the surplus heat by escaping from the opening in the perforated head of the vessel in which germination is going on, in one of which openings a thermometer may be placed to indicate the temperature prevailing within. The moist and cool air being forced through the grain in process of germination by passing through the perforations in the helices, it prevents clogging of these perforations, while the air itself, having become washed and purified by passing through the vessels in which the steeping process is taking place, possesses a sufficient degree of purity and moisture to insure perfect germination. The germinating process having been carried to the proper point, the green malt is discharged from the germinator and placed in the drier. To effect this transfer, the malt, as it is discharged from the vessels in which it is steeped and germinated, passes into a screw-conveyer 20ª, arranged between the series of vessels and having the construction usually adopted. This conveyer discharges the malt into an elevator-casing 20ᵇ, by which it is elevated to the floor above the vessels and discharged into or in the vicinity of the hopper 17ᵈ, arranged immediately above the drying-vessel 2.

Each of the vessels 3, 4, 5, 6, and 7 are used both for steeping and germinating. Germination commences when the steeping-water is drawn off and the man-hole is closed again, whereupon the steeped grain commences germinating in the said vessel in which it has been steeped, the several members of the series being filled at such intervals that the steeping process in each will be concluded at or about the close of each germination. The action of the drier has already been sufficiently described. This vessel (represented by the numeral 2) is filled to only one-half its capacity, or thereabout, to leave abundant room for agitation and the free passage of air, either cool or heated. The elimination of the moisture is usually accomplished by first driving or drawing currents of air at normal temperature through the drier during rotation, this being continued for about one hour, or until the grain has become sufficiently dry to apply heated air without danger of injuring the grain. The temperature of the air is then increased gradually until the grain is thoroughly dried and further germination checked. To effect this partial drying, I employ the apparatus shown in Fig. 4, in which the numeral 41 denotes a drum or cylinder mounted upon a perforated shaft 42, driven by a pulley 43 and having connection with a fan 44, by which currents of air are drawn rapidly through the drum, to which the malt is exposed by its constant agitation due to the revolution of the drum. In this manner a partial drying is effected in a very short time and the malt is brought into a condition where it will keep without injury for some time.

It will be noted that my process is divided into four distinct steps, viz: first, the steeping process; second, the germinating process; third, the preliminary elimination of moisture, and, fourth, the final drying process.

I have found that by my process of exposing the malt during the process of steeping to atmospheric air I am able to produce malt having a greater power to convert starch into the glucose and giving a greater yield of healthy yeast than is possible where the grain is continually immersed during the steeping process.

By my process of steeping and germinating the grain in one and the same rotating vessel I also avoid the repeated handling of the grain and the consequent loss in grain, material, time, and labor.

Heretofore and prior to my invention processes of malting grain by steeping and airing it has been known; but these processes, as far as I am aware, have consisted in steeping and then couching the grain, to expose it to the air, or in causing currents of air to flow over the grain while it is in process of steeping, in contradistinction to forcing air through the grain while steeping. It is impossible to derive benefit from the airing of the grain unless the air is brought into intimate contact with the grain throughout every part, which can only be done by the forcing of the air through the body of grain, as hereinbefore described. Moreover, while it has been customary to supply air and moisture to the germinating grain it has never been proposed to take air which has passed through the steeping grain and force it through the germinating grain. The effect produced upon the germinating grain by the air which comes directly from the steepers is very different from that produced by atmospheric air which has had no contact with the steeping grain, but has been moistened otherwise, the germination being facilitated materially by the former process and the results produced being better and more uniform.

What I claim is—

1. In the manufacture of malt, the process herein set forth, consisting in steeping the grain by subjecting it to the action of a constantly-flowing current of water, gently agitating the grain at the same time, forcing currents of air through the same, conveying this air charged with moisture to and forcing it through a separate body of germinating grain, said air being cooled in its passage from the steeping grain to the germinating grain, whereby the steeping grain is aired, the air purified and supplied with moisture, and the germinating grain cooled and moisture communicated thereto, substantially as described.

2. In the manufacture of malt, the process herein set forth, the same consisting in steeping the grain by alternately immersing it in water and then exposing it to currents of atmospheric air, simultaneously germinating a separate charge of steeped grain, and causing the moist air which has traversed the steeping grain to enter the germinating grain and supply the necessary moisture thereto, substantially as described.

3. In the manufacture of malt, the process herein set forth, the same consisting in steeping the grain by alternately immersing it in water, then exposing it to currents of atmospheric air, gently agitating the grain at the same time, germinating a separate charge of steeped grain in a separate vessel under a gentle agitation, introducing within the germinating grain the moist air which has traversed the steeping grain, then removing part of the moisture from the germinated grain by currents of air at normal temperature, and finally drying the same by currents of air of gradually-increasing temperature, substantially as described.

4. In a malting plant, the combination, with a series of steeping and germinating drums or vessels adapted to rotate upon anti-friction rolls, of gearing arranged to drive said drums, a water-pipe to supply each with a graduated stream, an air-pipe communicating with each drum, and a hollow perforated helix arranged within each drum to discharge the air from said pipe, substantially as described.

5. In the manufacture of malt, the process herein set forth, consisting in agitating a mass of grain in a body of water, gradually withdrawing the water at one point and introducing fresh water at another point, forcing atmospheric air into and through the mass of grain at different points, withdrawing and cooling the said air after it has passed through the steeping grain and forcing it through a separate body or mass of germinating grain to supply moisture, maintain the proper temperature, and facilitate the process of germination, substantially as described.

6. In a malting plant, the combination, with one or more steeping vessels or drums having heads resting upon rolls, of gears revolving said drums, an air-forcing pipe having communication with said vessels at one end, an air-suction pipe communicating with the drums at their opposite ends, a water-pipe having branches discharging into said drums, the latter being provided with water-outlets, one or more germinating vessels or drums with which said air-pipes have connection, and air-forcing mechanism whereby the air traversing the steeping-vessels may be caused to pass through the germinating-vessels, substantially as described.

7. In a malting plant, the combination, with a series of steeping and germinating vessels, of means for rotating said vessels, air-pipes arranged along the ends of said steeping and germinating vessels and provided with branches entering their ends and having valves, a water-pipe having branches which discharge into said vessels through the exit branches of the air-pipe, and an air-forcing pump connected with the air-pipe at one end of the vessels to draw air through said pipe and connected, also, with the air-pipe at the other end of said vessels to force the air drawn through the first pipe into and through the second pipe, whereby the air traversing any one or more of said vessels in which steeping is being carried on will be forced into and through the germinating grain in one or more separate vessels of the series, substantially as described.

8. In a malting plant, the combination of a series of vessels for steeping and germinating grain, said vessels provided with man-holes, of a drier arranged at one end of the series, means for rotating said vessels, air-pipes communicating with both ends of each vessel, water-pipes discharging into the vessels through the exit ends of the air-pipes, a conveyer arranged in line with the man-holes in said vessels, and an elevator arranged to deliver into the drier and into the casing of which said conveyer discharges, whereby the malt may be carried from any one of the said vessels to the floor over the drier and thence discharged into the drier, substantially as described.

In testimony whereof I have affixed my signature in presence of two witnesses.

FREDERICK W. WIESEBROCK.

Witnesses:
HOWARD E. PERRY,
C. F. DAVIES.